United States Patent Office 3,403,189
Patented Sept. 24, 1968

3,403,189
COLOR STABILIZATION OF PHENOL
Hans L. Schlichting, Grand Island, and Ellis I. Lichtblau, Kenmore, N.Y., assignors to Hooker Chemical Corporation, Niagara Falls, N.Y., a corporation of New York
No Drawing. Filed Nov. 30, 1965, Ser. No. 510,703
8 Claims. (Cl. 260—621)

ABSTRACT OF THE DISCLOSURE

A mixture of an aromatic ortho-hydroxycarboxylic acid of the formula

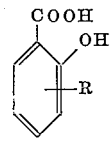

where R is selected from the group consisting of hydrogen, alkyl of one to five carbon atoms, and carboxyl groups, and a saturated aliphatic polycarboxylic acid containing from two to ten carbon atoms and from two to three carboxyl groups, each acid in the combination of said acids present being in a stabilizing proportion, can be used to stabilize phenol against deterioration in color and odor with age. A synergistic effect is suggested.

---

This invention relates to the stabilization of phenol ($C_6H_5OH$). More particularly, this invention relates to a method for improving the resistance of phenol against deterioration in color and odor with age, and to stable phenol compositions.

Phenol is widely used as raw material in the chemical, pharmaceutical, rubber and other industries. A discolored phenol is undesirable because of affecting the quality of the final products. It is well known that phenol, though carefully purified, tends to discolor on exposure to air and light. It is also known that certain contaminants stemming mainly from the manufacturing process or storage tanks employed, may act as accelerators causing a fast development of color.

Heretofore, it has been proposed to produce phenol of light color by incorporating color inhibitors to the phenol, such as stannous chloride and sulfurous acid. However, these additives have objectionable catalytic side effects causing, for instance, a development of a greenish color and causing also, for instance, disadvantageous effects on the condensation of such inhibited phenols with aldehydes or ketones to form phenolic resins.

Other proposals made, heretofore, deal with the incorporation of a phosphoric acid as a color inhibitor (U.S. 2,752,398), especially if the phenol is stored in iron tanks or will come in contact with iron surfaces. However, in the presence of other acidic contaminations, or also alkaline trace impurities, or also on exposure to light and air, the color inhibiting effects of phosphoric acid are considerably reduced.

According to the present invention, adding a stabilizing amount of a mixture of an aromatic ortho-hydroxycarboxylic acid and a saturated aliphatic polycarboxylic acid to phenol, preferably immediately after the phenol has been distilled, is highly effective in inhibiting a change in color of the phenol, even under extreme conditions, such as being held in a molten state in glass containers and exposed to the daily sunlight.

Each acid is present in a stabilizing amount, usually from 0.001 to 0.5 percent of the phenol, by weight and preferably 0.002 to 0.02 percent by weight. Preferably, the amount of the mixture used is between about 0.001 percent and about 0.5 percent by weight of the phenol. A more preferred amount is between about 0.002 percent and about 0.02 percent by weight of the phenol. This minute amount is surprisingly effective in inhibiting color formation in the phenol.

The aromatic ortho-hydroxycarboxylic acids to be used as stabilizers are of the formula

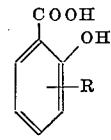

where R is selected from hydrogen, alkyl of one to five carbon atoms, and carboxyl groups. Illustrative of these compounds are salicylic acid, 4-methylsalicylic acid, 4-tertiary butylsalicylic acid, hydroxyterphthalic acid, and 4-hydroxyisophthalic acid, however, other acids within the defined formula may also be used. More than one such acid may be used.

The saturated aliphatic polycarboxylic acids to be used as stabilizers contain from two to ten carbon atoms, and are unsubstituted except in that they have from two to three carboxyl groups, and may also contain one or more hydroxyl substituents. Illustrative of these compounds are tartaric acid, citric acid, malic acid, malonic acid, succinic, suberic acid, azelaic acid, glutaric acid, adipic acid, pimelic acid, sebacic acid, oxalic acid, glyceric acid, tartronic acid, and the like acids. More than one such acid may be used. We prefer to use a mixture of citric acid and oxalic acid.

The incorporation of these two types of organic acids to stabilize phenol when in contact with air and/or exposed to light, is more effective than hitherto known stabilizers under comparable conditions. The mixture of the two types of acids is also more effective, surprisingly, than either one of the acids applied, alone, suggesting a synergistic effect.

Chelating agents may also be added in case of extended exposure to corroded iron surfaces. Suitable chelating agents are, for instance, ethylenediamine tetraacetic acid, or more preferably because of higher solubility 1,2-diaminocyclohexane - N,N,N',N' - tetraacetic acid. Other agents which stabilize phenol may also be added.

Color measurement of commercial phenol is generally given by reference to the American Public Health Association color scale, ranging, for instance, from zero to 70. However, this scale is not sensitive enough to be used to measure the initial development of colored materials in phenol stored under various conditions. In our studies, as illustrated in the examples below, a conventional photometric technique, for instance, described by W. West in Weissberger: Technique of Organic Chemistry, vol 1, part 2, p. 1399, Interscience Publisher, Inc., New York, N.Y., 1949, was used because the first slightly colored compounds formed in phenol obey Beer's law. That is, for phenol, the light absorption at the wavelength of 425 m$\mu$ is a function of the concentration of these compounds at the length of the sample cell. A light filter for this wavelength is standard equipment for most commercially available Electrophotometers.

Typical color stabilization effects obtained by incorporating the two types of organic acids according to the present invention in phenol, are shown in the following examples, which are given to further illustrate the invention and are not to be construed as limiting except as defined in the claims.

Example 1

Eleven 940 gram (10 moles) portions of freshly distilled USP-grade phenol were melted and except for a control portion, were mixed with the compounds listed in Table I and in the amounts given for each compound. The mixtures (a)–(d) represent compositions according to this invention, while mixtures (e)–(k) are shown for comparison purpose. These samples were placed in glass tubes, heated to about 100 degrees centigrade and exposed to ultraviolet light (sun lamp), while a slow stream of air was bubbled through the phenol. The formation of color was measured every hour by reading the percentage of light transmission at 425 m$\mu$ (electrophotometer) versus freshly distilled colorless phenol. The results for readings after six hours, compared with unstabilized phenol as control, are summarized in Table I.

Example 2

A like number of the phenol samples described in Example 1 were mixed with 19 milligrams NaOH each, (=20 p.p.m.) and exposed at 100 degrees centigrade to air and light for six hours. The results are summarized in Table II. Stabilized phenols (a)–(d) represent examples in accordance with this invention.

TABLE I

| Stabilizers | Percent light transmission, 425 m$\mu$ 6 hrs. exposure to air and ultraviolet light at 100° C. |
|---|---|
| None (control) | 30 |
| (a) 47 milligrams salicylic acid and 47 milligrams oxalic acid | 88 |
| Thus, the total addition is 0.01 percent by weight. | |
| (b) 47 milligrams salicylic acid and 47 milligrams citric acid | 85 |
| (c) 47 milligrams hydroxyisophthalic acid and 47 milligrams oxalic acid | 92 |
| (d) 47 milligrams hydroxyisophthalic acid and 47 milligrams citric acid | 88 |
| (e) 94 milligrams salicylic acid | 80 |
| (f) 94 milligrams oxalic acid | 80 |
| (g) 94 milligrams citric acid | 78 |
| (h) 94 milligrams hydroxyisophthalic acid | 83 |
| (i) 94 milligrams phosphoric acid | 80 |
| (j) 94 milligrams DL-alanine | 50 |
| (k) 94 milligrams disalicylidene ethylene diamine | 50 |

TABLE II.—STABILIZATION OF PHENOL IN THE PRESENCE OF 20 P.P.M. NaOH AS TRACE IMPURITY

| Stabilizers | Percent light transmission, 425 m$\mu$ 6 hrs. exposure to air and ultraviolet light at 100° C. |
|---|---|
| None (control) | 20 |
| (a) 47 milligrams salicylic acid and 47 milligrams oxalic acid | 60 |
| Thus, the total addition is 0.01% by wt. | |
| (b) 47 milligrams salicylic acid and 47 milligrams citric acid | 60 |
| (c) 47 milligrams hydroxyisophthalic acid and 47 milligrams oxalic acid | 70 |
| (d) 47 milligrams hydroxyisophthalic acid and 47 milligrams citric acid | 70 |
| (e) 94 milligrams salicylic acid | 40 |
| (f) 94 milligrams oxalic acid | 50 |
| (g) 94 milligrams citric acid | 50 |
| (h) 94 milligrams hydroxyisophthalic acid | 60 |
| (i) 94 milligrams phosphoric acid | 60 |
| (j) 94 milligrams DL-alanine | 50 |
| (k) 94 milligrams disalicylidene ethylenediamine | 40 |

Those skilled in the art will see modifications which can be made without departing from the scope of this invention. The invention described herein is not to be limited except as defined in the appended claims.

What is claimed is:

1. Phenol ($C_6H_5OH$) containing a mixture of an aromatic ortho-hydroxycarboxylic acid of the formula

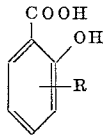

where R is selected from the group consisting of hydrogen, alkyl of one to five carbon atoms, and carboxyl groups, and a saturated aliphatic polycarboxylic acid containing from two to ten carbon atoms and unsubstituted except in that it has from two to three carboxyl groups and may also contain one or more hydroxyl substituents, each acid in the combination of said acids present being in a stabilizing proportion.

2. The phenol of claim 1 wherein the proportions of aromatic ortho-hydroxycarboxylic acid and saturated aliphatic polycarboxylic acid are from 0.001 percent to 0.5 percent by weight in the phenol.

3. The phenol of claim 1 wherein the mixture is present in an amount between about 0.001 percent and about 0.5 percent by weight of the phenol.

4. The phenol of claim 1 wherein the proportions of aromatic ortho-hydroxycarboxylic acid and saturated aliphatic polycarboxylic acid are from 0.002 to 0.02 percent by weight of the phenol.

5. The phenol of claim 1 stabilized with a mixture of salicyclic acid and oxalic acid.

6. The phenol of claim 1 stabilized with a mixture of salicyclic acid and citric acid.

7. The phenol of claim 1 stabilized with a mixture of hydroxyisophthalic acid and oxalic acid.

8. The phenol of claim 1 stabilized with a mixture of hydroxyisophthalic acid and citric acid.

References Cited

UNITED STATES PATENTS 2,672,485   3/1954   Menn et al.

LEON ZITVER, *Primary Examiner.*

H. ROBERTS, *Assistant Examiner.*